United States Patent

MacNeal et al.

[11] Patent Number: 6,085,770
[45] Date of Patent: Jul. 11, 2000

[54] REMOTE CYLINDER VALVE OPENER

[75] Inventors: James R. MacNeal, Burton; Richard D. Philpott, Chesterland; Matthew J. Philpott, Thompson, all of Ohio

[73] Assignee: AGA AB, Lidingo, Sweden

[21] Appl. No.: 08/936,574

[22] Filed: Sep. 24, 1997

[51] Int. Cl.[7] .............................. F16K 31/14; F16K 31/44
[52] U.S. Cl. ..................... 137/15.04; 137/240; 251/14; 251/58; 251/229; 251/230; 251/292; 74/577 R; 74/577 S; 74/625
[58] Field of Search ................................. 251/14, 58, 59, 251/229, 230, 248, 250, 292, 293; 137/382, 382.5, 15.04, 15.05, 240; 74/575, 577 R, 577 M, 625, 640, 577 S

[56] References Cited

U.S. PATENT DOCUMENTS

| | | | |
|---|---|---|---|
| 1,582,214 | 4/1926 | Gray | 251/214 |
| 1,929,867 | 10/1933 | Hall, Jr. | 251/214 |
| 3,203,266 | 8/1965 | Willis et al. | 251/230 |
| 3,332,438 | 7/1967 | Abdullaev et al. | 251/230 |
| 3,338,140 | 8/1967 | Sheesley | 251/230 |
| 3,801,062 | 4/1974 | Arn et al. | 251/14 |
| 4,034,958 | 7/1977 | Masclet | 251/250 |
| 4,037,472 | 7/1977 | Gates | 137/205 |
| 4,116,216 | 9/1978 | Rosenberg | 251/230 |
| 4,180,238 | 12/1979 | Muchow | 251/230 |
| 4,221,236 | 9/1980 | Rosenberg | 251/230 |
| 4,225,110 | 9/1980 | Akkerman et al. | 251/58 |
| 4,304,262 | 12/1981 | Icking | 251/230 |
| 4,380,325 | 4/1983 | Palmer | 251/14 |
| 4,616,803 | 10/1986 | Schils | 251/214 |
| 4,629,157 | 12/1986 | Tsuchiya | 251/250 |
| 4,637,423 | 1/1987 | Gray | 251/14 |
| 4,647,003 | 3/1987 | Hilpert et al. | 251/14 |
| 4,700,735 | 10/1987 | Hamernik et al. | 251/250 |
| 4,706,929 | 11/1987 | Kalaskie et al. | 251/14 |
| 4,815,692 | 3/1989 | Loiaeau et al. | 251/14 |
| 4,819,682 | 4/1989 | Van Marcke | 251/14 |
| 4,872,482 | 10/1989 | Jarrett | 251/292 |
| 5,060,539 | 10/1991 | Cissell et al. | 74/89.15 |
| 5,238,022 | 8/1993 | Zink | 251/230 |
| 5,257,771 | 11/1993 | Portis et al. | 251/293 |
| 5,340,078 | 8/1994 | Dean | 251/292 |
| 5,381,996 | 1/1995 | Arnemann | 251/59 |
| 5,579,801 | 12/1996 | Pye et al. | 251/292 |

*Primary Examiner*—George L. Walton
*Attorney, Agent, or Firm*—Pearne & Gordon LLP

[57] ABSTRACT

A method and apparatus for remotely opening a manual valve of a gas cylinder from a remote location. The gas cylinder is first connected to a purge system which is purged of oxygen and pressurized with an inert gas to a pressure near that of the gas cylinder. The manual valve is then engaged with a pneumatic stepper mechanism. Pneumatic fluid is supplied to the pneumatic stepper mechanism to rotate the manual valve a predetermined stepped increment. The step of supplying pneumatic fluid to the pneumatic stepper mechanism is repeated, after pausing to let the system settle, to rotate the manual valve another stepped increment. The steps of rotating and pausing are repeated until the manual valve is opened. The purge system is then vented to atmosphere through a diffuser. Both the pneumatic stepper mechanism and the purge system are fully operable from the remote location. The pneumatic stepper mechanism includes a ratchet assembly and an attachment assembly connecting the ratchet assembly to the manual valve. The ratchet assembly includes a gear rotatable about all axis, a drive arm pivotable about the axis, a pneumatic cylinder attached to the drive bar, and a driving pawl pivotably attached to the drive bar and operably engaging the gear. The drive bar is reciprocally pivoted about the axis as the pneumatic cylinder extends and retracts and the driving pawl rotates the gear in only one direction as the drive bar pivots.

17 Claims, 6 Drawing Sheets

REMOTE CYLINDER VALVE OPENER

BACKGROUND OF THE INVENTION

The present invention generally relates to valve openers or actuators for manual valves of gas cylinders and, more specifically, to valve openers which can open the manual valves from a remote location.

Many compressed gas companies prepare mixtures of gases which contain flammables and oxidizers. On occasion, an error occurs which permits a flammable mixture to exist in the cylinder (i.e., gases exist in the proper proportion to permit combustion). Because the mixture has everything required to burn or explode, except an ignition source, the gas cylinder is an extreme danger to personnel in the vicinity. Mechanical energy, shock, static discharge, or adiabatic heat of recompression can be sufficient to ignite the mixture, potentially causing an explosion.

Some gas mixture manufacturers simply use the manual valve while others use either a mechanical-electric stepper motor device affixed to the gas cylinder or a pneumatic powered device affixed to the gas cylinder to open the manual valve. The manual valve alone cannot be opened from a remote location, that is a safe distance, and therefore poses a risk to the person opening the manual valve. While both electric stepper motors and pneumatic activated valves openers can be operated from a remote distance from the gas cylinder, they each have significant disadvantages or risks. Electric devices carry a degree of risk from sparks and electric current as potential ignition sources. Pneumatic devices do not stop once they overcome the torque necessary to begin valve opening (breakaway torque), and can permit adiabatic heat of compression to reach a high enough temperature or a high enough velocity to provide an ignition source as the mixture exits the valve and proceeds into a piping system. Accordingly, there is a need in the art for an improved valve actuator for safely opening manual valves of gas cylinders from a remote location.

BRIEF SUMMARY OF THE INVENTION

The present invention provides a method of opening a manual valve of a gas cylinder from a remote location which overcomes at least some of the above-noted problems of the related art. According to the present invention, a pneumatic stepper mechanism is connected to the gas cylinder and engaging the manual valve. Pneumatic fluid is then supplied to the pneumatic stepper mechanism to rotate the manual valve a stepped increment. After pausing to let the system stabilize, the step of supplying pneumatic fluid to the pneumatic stepper mechanism is repeated to rotate the manual valve another stepped increment. The steps of incrementally rotating the manual valve and pausing are continued until the manual valve is open. Preferably, a purge system is connected to the manual valve which is pressurized with an inert gas prior to opening the manual valve to dilute the mixture, minimize adiabatic heat of recompression, and reduce mixture velocity in the piping system. After the manual valve is open and the system is stabilized, the purge system is vented to atmosphere through a diffuser and/or flash arrestor.

According to another aspect of the present invention, a pneumatic stepper mechanism for opening the manual valve includes a ratchet assembly which is pneumatically stepped and a valve attachment assembly which operably connects the manual valve to the ratchet assembly. The ratchet assembly includes a gear rotatable about an axis, a drive arm pivotable about the axis, a pneumatic cylinder attached to the drive bar for pivoting the drive bar about the axis, and a driving pawl pivotably attached to the drive bar and operably engaging said gear. The pneumatic cylinder extends and retracts to pivot the drive bar and the driving pawl rotates the gear in one direction as the drive bar pivots. The attachment assembly includes a plurality of detachable drive pins connected to the gear and adapted to engage and rotate a variety of different size manual valves as the gear rotates. Preferably, a flag member is connected to the gear and is rotatable about the axis to visiably indicate rotation of the gear so that it is observable at the remote location.

According to yet another aspect of the present invention, the purge assembly includes a generally cross-shaped gas line assembly, a pressure gauge connected to the gas line assembly, a first pneumatic valve having an inlet connected to the manual valve of the gas cylinder and an outlet connected to the gas line assembly, a second pneumatic valve having an inlet connected to a source of purge gas and an outlet connected to the gas line assembly, and a third pneumatic valve having an inlet connected to the gas line assembly and an outlet connected to a diffuser and/or flash arrestor. The purge system is fully automatic so that it can be operated from the remote location. Preferably, flag members are connected to the pneumatic valves and are movable between up and down positions to visably indicate whether the pneumatic valves are open or closed so that it is observable at the remote location.

BRIEF DESCRIPTION OF THE SEVERAL VIEWS OF THE DRAWINGS

These and further features of the present invention will be apparent with reference to the following description and drawings, wherein.

DETAILED DESCRIPTION OF THE INVENTION

Figure 1:
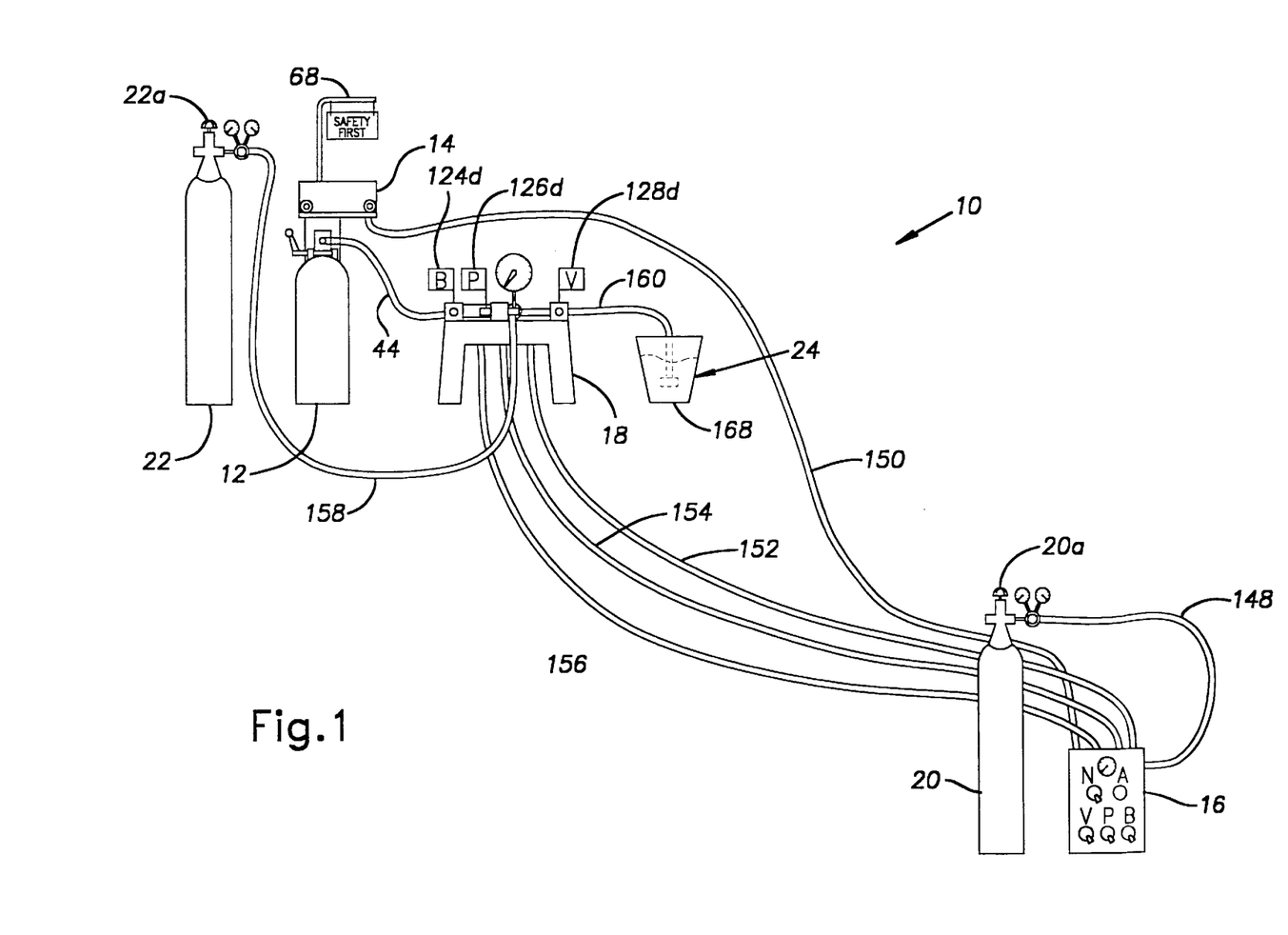
FIG. 1 is a diagrammatic view of a remote opening system according to the present invention which is configured to open a manual valve of a gas cylinder.
Figure 2:
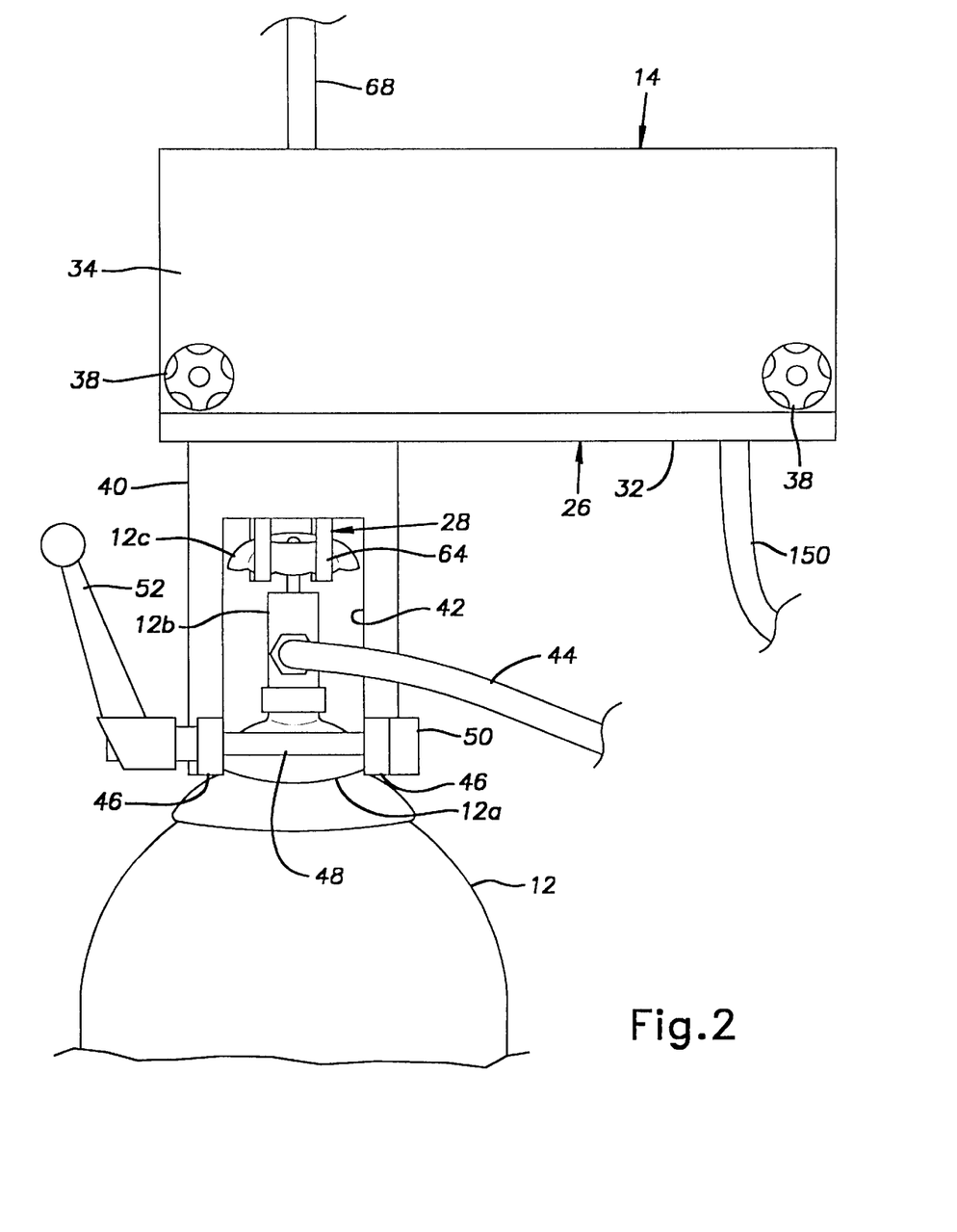
FIG. 2 is an enlarged elevational view of an opener mechanism of the remote opener of FIG. 1.
Figure 3:
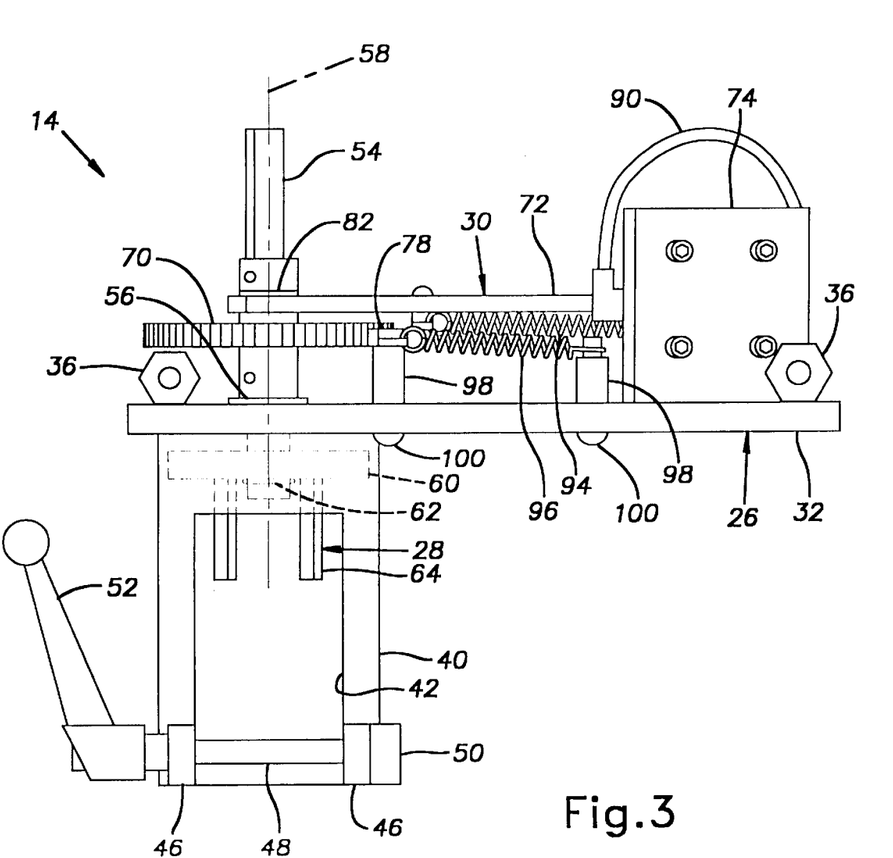
FIG. 3 is an elevational view of the opener mechanism of FIG. 2 removed from the gas cylinder and with a cover member removed for clarity.
Figure 4:
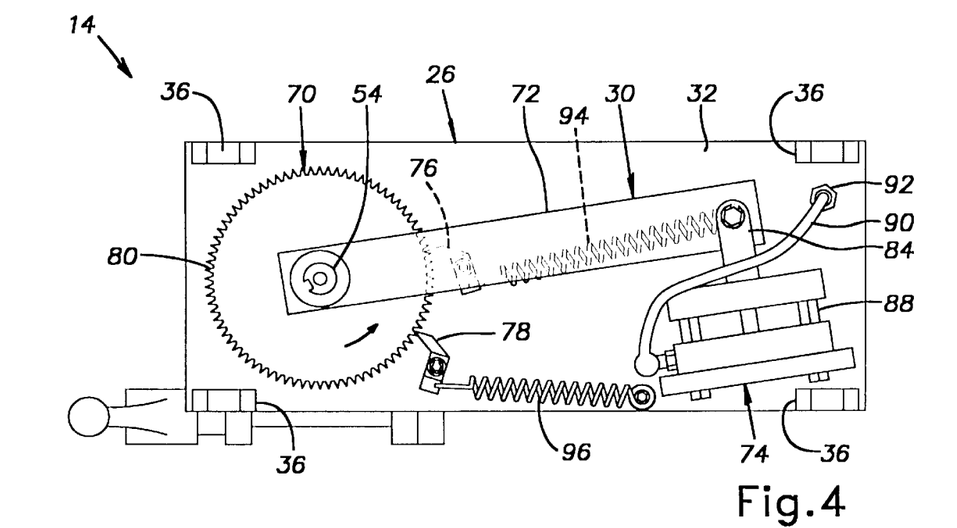
FIG. 4 is a top plan view of the opener mechanism of FIG. 3.
Figure 5:
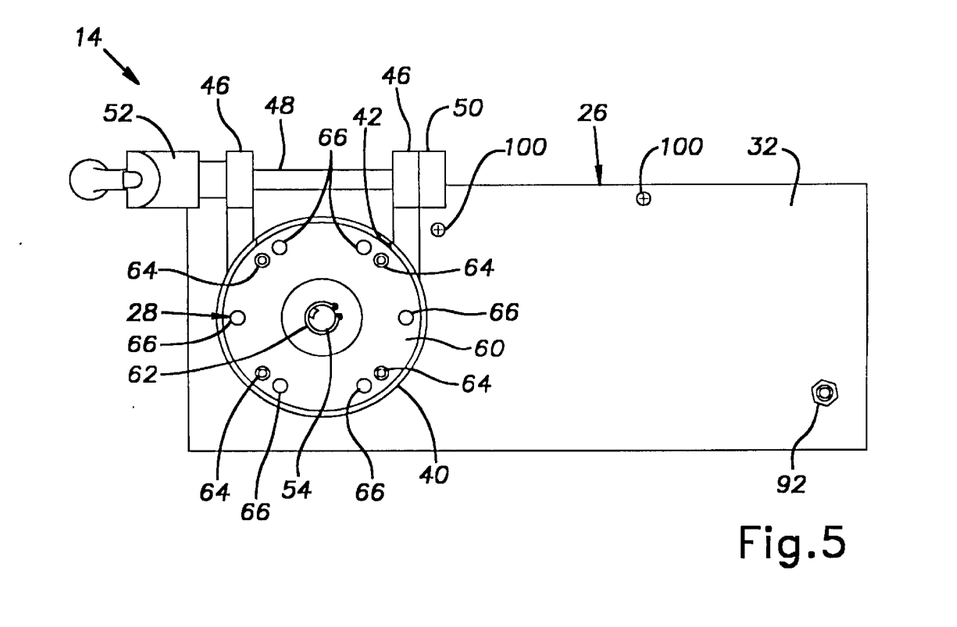
FIG. 5 is a bottom plan view of the opener mechanism of FIG. 3.

FIG. 1 illustrates a remote opening system 10 according to the present invention which is configured to open a manual valve of a gas cylinder or bottle 12 containing a dangerous combination of gases, hereinafter referred to as the "affected cylinder" or "bad bottle". The remote opening system 10 includes a pneumatic stepper or opener mechanism 14, a control panel 16, a purge cross or assembly 18, a source of pneumatic fluid 20, a source of purge gas 22, a diffuser and/or flash arrestor 24, and a plurality of hoses connecting the various components. At least the control panel 16 is located at a remote location, that is a safe distance, from the affected cylinder 12 to be opened. The remote location is preferably at least 100 feet away from the affected cylinder 12.

As best shown in FIGS. 2–5, the opener mechanism 14 includes a support assembly 26, a valve attachment assembly 28, and a ratchet assembly 30. The support assembly 26 includes a rectangular and planar base plate 32 and a rectangular and hollow cover member 34 removably secured to the top of the base plate 32. In the illustrated embodiment, threaded lugs 36 are welded to the top surface of the base plate 32 at the corners of the base plate 32 to receive four thumb screws 38 attached to the cover member 34. The thumb screws 38 cooperate with the lugs 36 to removably secure the cover member 34 to the base plate 32. A generally cylindrical attachment member 40 extends downwardly from the bottom surface of the base plate 32 at one end of the base plate 32. The attachment member 40 is sized to closely fit on a collar of a standard size of gas cylinder. The attachment member 40 can be sized to accept various sizes of collars which may be encountered The attachment member 40 has an opening 42 formed in one side which extends to the bottom of the attachment member 40. The opening 42 allows the passage of a hose or line 44 to the manual valve of the affected cylinder 12 and provides flexibility to clamp the attachment member 40 to the collar 12a of the affected cylinder 12. Outwardly extending from the bottom of the attachment member 40, on opposite sides of the opening, are a pair of arms 46. A clamping bolt or member 48 extends through the arms 46 and cooperates with a threaded lug 50 welded to one of the arms 46 to compress the arms 46 toward one another and thereby securely clamps the attachment member 40 on the collar of the affected cylinder 12. A handle member 52 is provided at the end of the clamping member 48 for rotating the clamping member 48. Preferably, the handle member 52 is a one-way clutch-type handle.

The valve attachment assembly 28 includes a vertically extending shaft 54 which extends through the base plate 32 and is rotatably supported in a bushing or bearing 56 for rotation relative to the base plate 32 on a substantially vertical rotational axis 58. A circular plate 60 is removably secured to the lower end of the shaft 54 with a lock ring 62 for rotation with the shaft 54. The circular plate 60 is sized to fit within the attachment member 40 and is located at the top of the attachment member 40 below the base plate 32. A plurality of drive pins 64, four in the illustrated embodiment, downwardly extend from the bottom of the circular plate 60. The drive pins 64 are sized and shaped to cooperate with the affected cylinder valve as described in more detail hereinafter. Upper ends of the drive pins 64 are threaded and secured in cooperating threaded holes 66 in the circular plate 60 to removably attach the drive pins 64 to the circular plate 60. Additional threaded holes 66 are provided in the circular plate 60 so that the drive pins 64 can be located to match a wide variety of sizes of manual valves on the affected cylinder 12.

The valve attachment assembly 28 also includes a flag member 68. The flag member 68 is threadably secured to the upper end of the shaft 54 for rotation therewith and extends through a clearance hole in the top of the cover member 34. The flag member 68 is sized so that it can be viewed by the operators at the remote location to provide an indication that the shaft 54 is rotating.

The ratchet assembly 30 includes a gear 70, a drive arm 72, a pneumatic cylinder 74, a first or driving pawl 76, and a second or locking pawl 78. The gear 70 has a plurality of, radially extending teeth 80 forming a plurality of engagement surfaces. Preferably, there are about 120 teeth 80 but a greater or fewer number can be utilized. The gear 70 is secured to the shaft 54 for rotation therewith above the base plate 32. The drive arm 72 is a generally elongate and rectangular bar and has one end rotatably attached to the shaft 54 for rotation relative to the shaft 54 about the vertical rotational axis 58. Preferably, the drive arm 72 is supported by a bushing or bearing 82. The other end of the drive arm 72 is pivotally attached to a piston shaft 84 of the pneumatic cylinder 74.

The pneumatic cylinder 74 has a piston 86 (FIG. 8) reciprocally held within a cylinder 88. Pneumatic fluid is introduced on one side of the piston to move the piston 86 and the piston shaft 84 to all extended position. When the pressure of the pneumatic fluid is bled away, the piston 86 is returned to a retracted position by a spring member (not specifically shown). The pneumatic cylinder 74 is secured to the upper surface of the base plate 32 and is positioned such that linear movement of the piston shaft 84 reciprocally pivots the drive arm 72 about the vertical rotational axis 58. A pneumatic fluid input line 90 extends from the pneumatic cylinder 74 to a fitting 92 extending through the base plate 32 so that the source of pneumatic fluid 20 can be fluidly connected to the pneumatic cylinder 74.

The driving pawl 76 is pivotally attached to the lower surface of the drive arm 72 and is sized and shaped to cooperate with the teeth 80 of the gear 70 to prevent counter-clockwise rotation (as viewed in FIG. 4) of the drive arm 72 relative to the gear 70 and to allow clockwise rotation (as viewed in FIG. 4) of the drive arm 72 relative to the gear 70. A spring member 94 is provided to bias the driving pawl 76 into engagement with the gear 70.

The locking pawl 78 is pivotally attached to the upper surface of the base plate 32 and is sized and shaped to cooperate with the teeth 80 of the gear 70 to allow counter-clockwise rotation (as viewed in FIG. 4) of the gear 70 relative to the base plate 32 and to prevent clockwise rotation (as viewed in FIG. 4) of the gear 70 relative to the base plate 32. A spring member 96 is provided to bias the locking pawl 78 into engagement with the gear 70. Standoff or spacer members 98 are provided to space the locking pawl 78 above the base plate 32 and to position the locking pawl 78 adjacent the gear 70. The spacer members 98 are attached to the base plate 32 with threaded fasteners 100.

Figure 6:
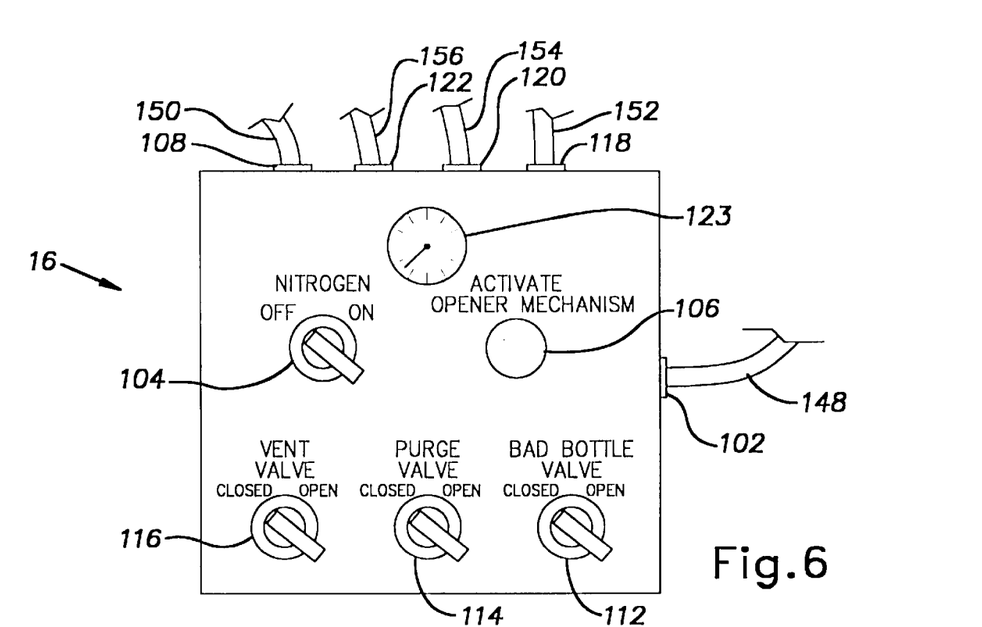
FIG. 6 is an enlarged elevational view of a control panel of the remote opening system of FIG. 1.

As best shown in FIG. 6, the control panel 16 includes an inlet port 102 which is connected to a first or system valve 104. The system valve 104 is a manual valve which is actuated between fully open and fully closed positions via a knob. The system valve 104 is fluid communication with a second or opener-mechanism valve 106. The opener-mechanism valve 106 is a manual valve which is actuated between fully open and fully closed positions via a push button. The opener-mechanism valve 106 is connected to a first outlet port 108. A ramping valve 110 is located between the opener-mechanism valve 106 and the first outlet port 108 as described in more detail hereinafter.

The system valve 104 is also in fluid communication with a third or affected cylinder valve 112, a fourth or purge-valve 114, and a fifth or vent valve 116. The affected-cylinder, purge, and vent valves 112, 114, 116 are each manual valves actuated between fully open and fully closed positions via knobs. The affected cylinder, purge, and vent valves 112, 114, 116 are connected to second, third, and fourth outlet ports 118, 120, 122 respectively. A pressure gauge 123 and a needle valve 125 (FIG. 8) are located between the system valve 104 and each of the other valves 106, 112, 114, 116. All of the pneumatic components of the control panel 16 are preferably rated for pressures of at least about 100 psi.

Figure 7:
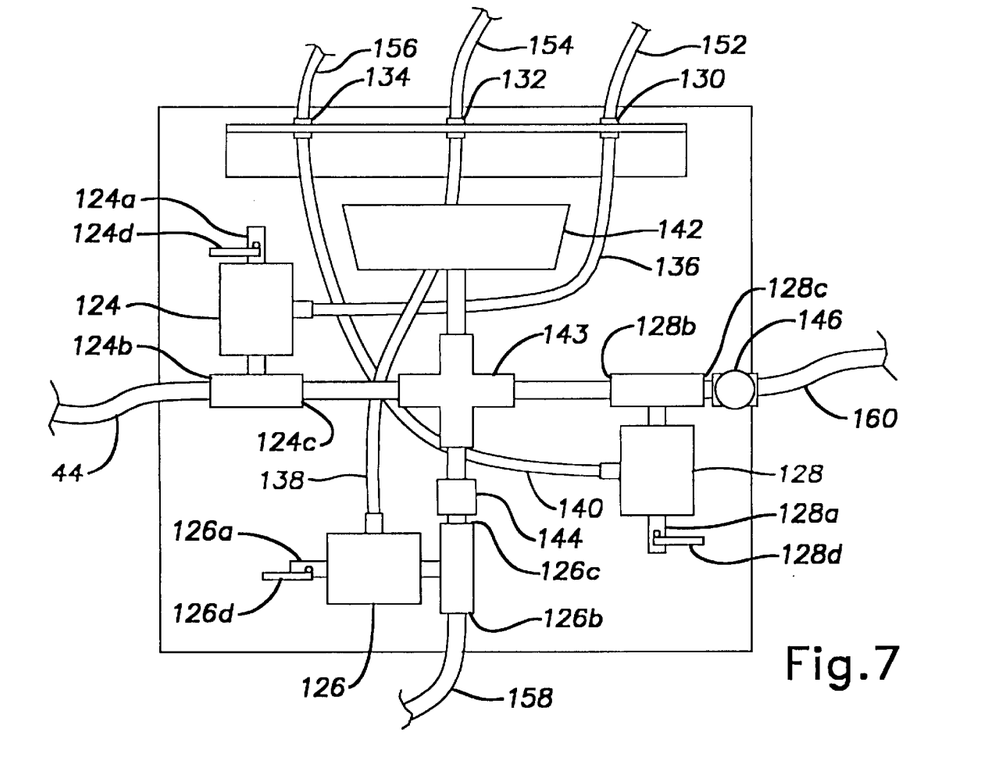
FIG. 7 is an enlarged plan view of a purge cross of the remote opening system of FIG. 1.

As best shown in FIG. 7, the purge cross 18 includes a first or affected-cylinder valve 124, a second or purge valve 126, and a third or vent valve 128. The affected-cylinder, purge, and vent valves 124, 126, 128 are each butterfly pneumatic valves actuated between fully open and fully closed positions via pneumatic fluid. Pneumatic fluid inlets of the affected cylinder, purge, and vent valves 124, 126, 128 are connected to first, second, and third inlet fittings or ports 130, 132, 134 respectively via suitable hoses or lines 136, 138, 140. The outlets 124c, 126c of the affected-cylinder and purge valves 124, 126, the inlet 128b of the vent valve 128, and a pressure gauge 142 are each connected to one another by a hose or line assembly 143 having a cross-shaped configuration as shown in FIG. 7. The pressure gauge 142 preferably has a large face sized so that it can be viewed by the operators at the remote location to indicate the gas pressure within the purge assembly 18. The outlet of the purge valve 126 is provided with a one-way or check valve 144 to ensure that gas only flows out of the purge valve 126 and not into the purge valve 126. The outlet of the vent valve 128 is provided with a needle valve 146 so that the flow rate of gas exiting the vent valve 128 can be adjusted. All of the components of the purge assembly are preferably rated for pressures of at least about 3500 psi.

Each of the pneumatic valves 124, 126, 128 is provided with a flag member 124d, 126d, 128d. The flag members 124d, 126d, 128d are secured to the outer end of horizontally extending shafts 124a, 126a, 128a of the valves 124, 126, 128 for rotation therewith. The flag members 124d, 126d, 128d are sized and positioned so that they can be viewed by the operators at the remote location to indicate whether the pneumatic valves 124, 126, 128 are open or closed. Preferably, the flag members 124d, 126d, 128d are in a vertical or up position (as seen in FIGS. 1 and 7) when the pneumatic valves 124, 126, 128 are closed and rotated 90 degrees to a horizontal or down position when the pneumatic valves 124, 126, 128 are open. Preferably, each flag member 124d, 126d, 128d is provided with indicia which can be viewed from the remote location for identifying it's associated valve. In the illustrated embodiment, the flag members 124d, 126d, 128d are provided with the letters "B", "P", and "V" respectively.

Figure 8:
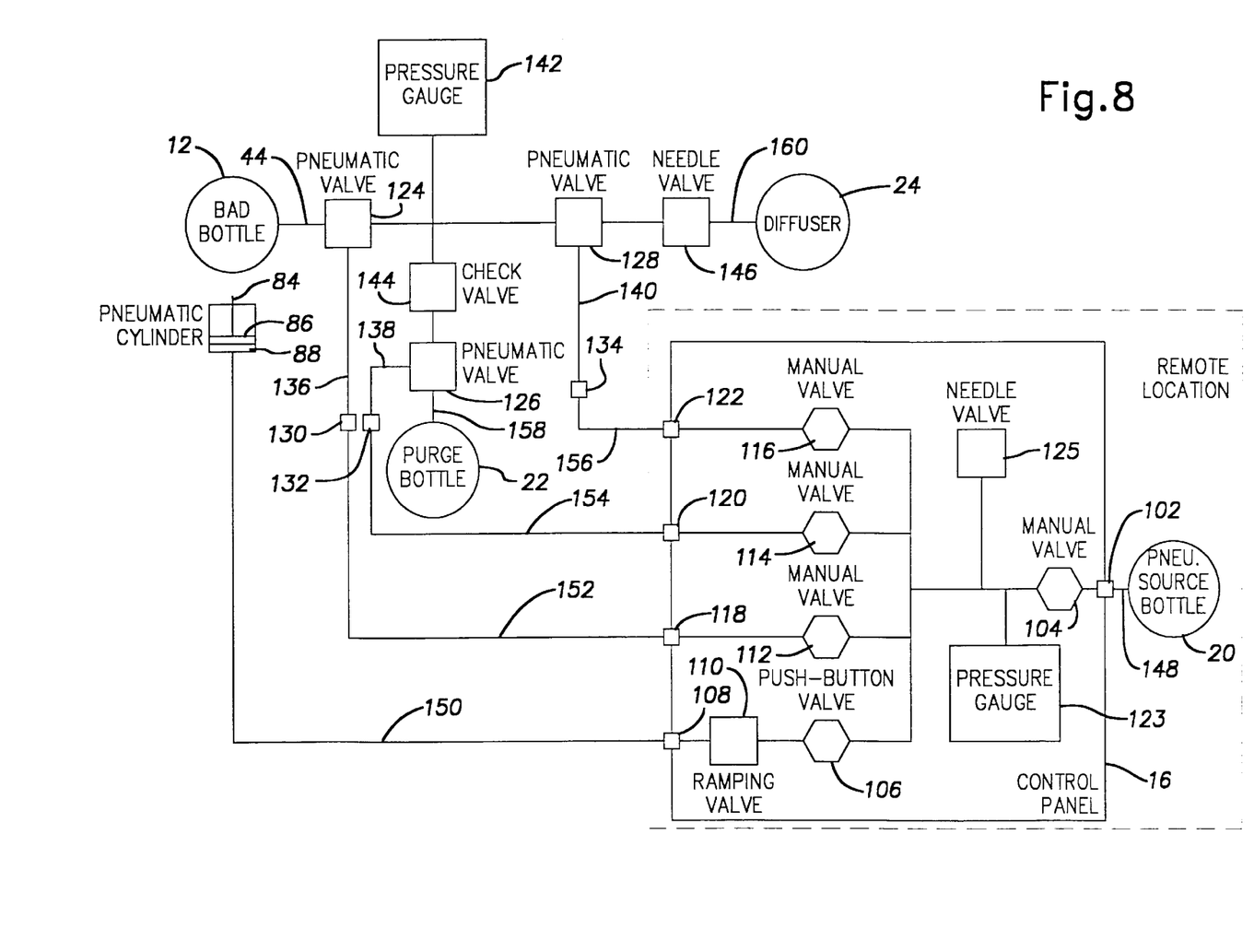
FIG. 8 is a schematic diagram of the remote opening system of FIG. 1.

FIG. 8 schematically illustrates the remote opening system 10 of FIG. 1. The pneumatic fluid source 20 is connected to the inlet port 102 of the control panel 16 by a suitable hose or line 148 to connect the pneumatic fluid 20 source with the system valve 104. The pneumatic fluid 20 source is preferably a cylinder of compressed gas. The pneumatic fluid is preferably nitrogen gas or another suitable inert gas.

The first outlet port 108 of the control panel 16 is connected to the inlet fitting 92 of the opener mechanism 14 by a suitable hose or line 150. The line 150 connects the opener-mechanism valve 106 of the control panel 16 with the pneumatic cylinder 74 of the opener mechanism 14. The second outlet port 118 of the control panel 16 is connected to the first inlet fitting 130 of the purge assembly 18 by a suitable hose or line 152. The line 152 connects the affected-cylinder valve 112 of the control panel 16 with the affected-cylinder valve 124 of the purge assembly 18. The third outlet port 120 of the control panel 16 is connected to the second inlet fitting 132 of the purge assembly 18 by a suitable hose or line 154. The line 154 connects the purge valve 114 of the control panel 16 with the purge valve 126 of the purge assembly 18. The fourth outlet port 122 of the control panel 16 is connected to the third inlet fitting 134 of the purge assembly 16 by a suitable hose or line 156. The line 156 connects the vent valve 116 of the control panel 16 with the vent valve 128 of the purge assembly 18. The lines 150, 152, 154, 156 connecting control panel 16 with the opener mechanism 14 and the purge assembly 18 are each sized such that the control panel 16 can be located at the remote location and preferably are at least 100 feet long.

The affected cylinder 12 is connected to the inlet 124b of the purge assembly affected-cylinder valve 124 by the line 44. The source of purge gas 22 is connected to the inlet 126b of the purge assembly purge valve 126 by a suitable hose or line 158. The purge gas source 22 is preferably a cylinder of compressed gas. The purge gas is preferably nitrogen gas or another suitable inert gas. An outlet 128c of the purge assembly vent valve 128 is connected to the diffuser and/or flash arrestor 24 by a suitable hose or line 160. The diffuser 24 is preferably a provided with a flash arrester 168. The flash arrester 168 is a container of a suitable quantity of water wherein the diffuser 24 is placed within the water.

To open the affected cylinder 12, the control panel 16 is attached to the opener mechanism 14 and the purge assembly 18 with the lines 150, 152, 154, 156 as discussed hereinabove. All of the valves are closed and it should be verified that all of the valve flag members 124d, 126d, 128d are in the up or closed position. The purge gas cylinder 22 and the diffuser 24 are attached to the purge valve inlet 126b and vent valve outlet 128c of the purge assembly 18 with the lines 158, 160 as discussed hereinabove. The valve 22a of the purge gas cylinder 22 is opened and the needle valve 146 of the purge assembly 18 is set to full open.

The opener mechanism 14 is attached to the affected cylinder 12 by placing the attachment member 40 over the collar 12a of the affected cylinder 12 such that the drive pins 64 of the valve attachment assembly 28 interlock with the lobes of the affected cylinder valve handle 12c. Note that the locations of the drive pins 64 may be adjusted to fit the particular size and shape of valve handle. 12c. The handle member 52 is turned to tighten the clamping member 48 until the attachment member 40 is securely gripping the affected cylinder collar 12a. The valve 12b of the affected cylinder 12 is then connected to the inlet 124b of the purge assembly affected-cylinder valve 124 with the line 44. All personal are then evacuated from the vicinity of the affected cylinder 12.

With the set-up steps of the procedure complete and the affected-cylinder vicinity evacuated, the system is purged to remove all oxygen. The valve 20a of the pneumatic fluid cylinder 20 is opened to pressurize the pneumatic system, typically to about 80 psi. The pressure is verified by viewing the pressure gauge 123 of the control panel 16. The affected-cylinder valve 112 of the control panel 16 is manually switched to the open position. Pneumatic fluid automatically opens the affected-cylinder valve 124 of the purge assembly 18. As the affected-cylinder valve 124 of the purge assembly 18 opens, the flag member 124d rotates to the down position.

Once it is verified that only the purge and vent flag members 126d, 128d are in the up position, the purge valve 114 of the control panel 16 is manually switched to the open position. Pneumatic fluid automatically opens the purge valve 126 of the purge assembly 18. As the purge valve 126 of the purge assembly 18 opens, the flag member 126d rotates to the down position. With the valve 126 open, purge gas from the purge gas cylinder 22 pressurizes the system, typically to about 2600 psi. The pressure in the system is verified by remotely viewing the pressure gauge 142 of the purge assembly 18.

Once it is verified that only the vent flag member 128d is in the up position and the system is pressurized, the purge valve 114 of the control panel 16 is manually switched to the closed position and the purge valve 126 of the purge assembly 18 automatically closes. As the purge valve 126 of the purge assembly 18 closes, the purge flag member 126d rotates to the up position. Once it is verified that only the purge and vent flag members 126d, 128d are in the up position, the vent valve 116 of the control panel 16 is manually switched to the open position. Pneumatic fluid automatically opens vent valve 128 of the purge assembly 18. As the vent valve 128 of the purge assembly 18 opens, the vent flag member 128d rotates to the down position. With the vent valve open 128, gas exits the system through the diffuser 24 to depressurize the system. The pressure of the system is verified by remotely viewing the pressure gauge 142 of the purge assembly 18.

Once it is verified that only the purge flag member 126d is in the up position and the system is depressurized, the vent valve 116 of the control panel 16 is manually switched to the closed position and the vent valve 128 of the purge assembly 18 automatically closes. As the vent valve 128 of the purge assembly 18 closes, the vent flag member 128d rotates to the up position. Once it is verified that only the purge and vent flag members 126d, 128d are in the up position, the above-described steps of pressurizing and depressurizing the system are repeated several times, preferably about 7 times, until all oxygen is removed from the system. The needle valve 146 of the purge assembly 18 is then manually set to a desired flow rate, preferably much less than full open, and the affected cylinder vicinity is again evacuated.

With the set-up and purge steps of the procedure complete and the affected-cylinder vicinity evacuated, the system is again pressurized. Once it is verified that only the purge and vent flag members 126d, 128d are in the up position, the purge valve 114 of the control panel 16 is manually switched to the open position. Pneumatic fluid automatically opens the purge valve 126 of the purge assembly 18. As the purge valve 126 of the purge assembly 18 opens, the purge flag member 126d rotates to the down position. With the purge valve 126 open, nitrogen gas from the purge gas cylinder 22 pressurizes of the system. Preferably to a pressure at or near the pressure of the affected cylinder 12. The system pressure is verified by remotely viewing the pressure gauge 142 of the purge assembly 18. Once it is verified that only the vent flag member 128d is in the up position and the system is appropriately pressurized, the purge valve 114 of the control panel 16 is manually switched to the closed position and the purge valve 126 of the purge assembly 18 automatically closes. As the purge valve 126 of the purge assembly 18 closes, the purge flag member 126d rotates to the up position. Once it is verified that only the purge and vent flag members 126d, 128d are in the up position, the process of bleeding gas from the affected cylinder 12 can begin.

The push button of the opener mechanism valve 106 is depressed and released to activate the opener mechanism 14. Pneumatic fluid actuates the pneumatic cylinder 74 to extend the piston rod 84 therefrom which pivots the drive arm 72 about the vertical axis 58. The driving pawl 76 drives the gear 70 which rotates or steps the shaft 54 an equal amount. The gear is rotated about 3 degrees, that is 1 of 120 teeth. The assembly can be incrementally stepped other amounts but it is noted that the increments are preferably less than 10 degrees and are more preferably less than 5 degrees.

The locking pawl 78 is deflected out of engagement with the gear 70 as the gear 70 rotates and is resiliently returned into engagement with the next gear tooth 70 by the spring member 96 as the gear 70 rotates. As the shaft 54 rotates, the plate 60 and the drive pins 64 secured thereto also rotate an equal amount to rotate or step the valve handle 12c of the affected cylinder 12 which is interlocked therewith in the counter-clockwise direction (as viewed in FIG. 4). As the shaft 54 incrementally rotates, the shaft flag member 68 rotates therewith. The incremental rotation, therefore, can be remotely verified by viewing the flag member 68.

The ramping valve 110 feeds a decreasing rate of pneumatic fluid to the pneumatic cylinder 74 until a spring member of the pneumatic cylinder 74 overcomes the pneumatic pressure and retracts the piston rod 84. The retracting piston rod 84 pivots the drive arm 72 about the vertical axis 58 in the reverse or clockwise direction (as viewed in FIG. 4). The driving pawl 76 is deflected out of engagement with the gear 70 as the drive arm 72 pivots and is resiliently returned into engagement with the next gear tooth 70 by the spring member 94 as the drive arm 72 pivots. The locking pawl 78 prevents the gear 70 and shaft 54 from rotating in the reverse or clockwise direction (as viewed in FIG. 4) with the drive arm 72. It is noted that the ramping valve 110 prevents abuse of the system, such as slamming, and also controls pressure bleed-off so that the opener mechanism 14 cannot be activated again before the drive arm 72 ratchets back. The opener mechanism 14 is activated again and again in the above described manner until the manual valve 12b is open. Pressure changes of the system are monitored by remotely viewing the pressure gauge 142 of the purge assembly 18 and rotation of the shaft 54 is monitored by remotely viewing the shaft flag member 68.

Once the valve 12b of the affected cylinder 12 is open and the system pressure has stabilized, the vent valve 116 of the control panel 16 is manually switched to the open position. Pneumatic fluid automatically opens vent valve 128 of the purge assembly 18. As the vent valve 128 of the purge assembly 18 opens, the vent flag member 128d rotates to the down position. With the vent valve 128 open, gas is bled from the system through the diffuser 24 and the water at a relatively slow rate, controlled by the needle valve 146, to depressurize the system. System pressure is verified by remotely viewing the pressure gauge 142 of the purge assembly 18.

Once it is verified that only the purge flag member 126d is in the up position and the system is depressurized, the vent valve 116 of the control panel 16 is manually switched to the closed position and the vent valve 128 of the purge assembly 18 automatically closes. The system is then purged, pressurized and depressurized several times, as described hereinabove.

Although particular embodiments of the invention have been described in detail, it will be understood that the invention is not limited correspondingly in scope, but includes all changes and modifications coming within the spirit and terms of the claims appended hereto.

What is claimed is:

1. A method of opening a manual valve of a gas cylinder:
   engaging the manual valve with a pneumatic stepper mechanism;
   supplying pneumatic fluid to the pneumatic stepper mechanism to rotate the manual valve a stepped increment;
   pausing the further supply of pneumatic fluid to the pneumatic stepper mechanism to thereby prevent further movement of said manual valve;
   repeating the steps of supplying and pausing to thereby open the manual valve to release gas from the gas cylinder in a relatively slow and controlled manner.

2. The method according to claim 1, wherein said stepped increment is less than about 10 degrees.

3. The method according to claim 1, wherein said stepped increment is less than about 5 degrees.

4. The method according to claim 1, wherein said stepped increment is about 3 degrees.

5. The method according to claim 1, further comprising the steps of connecting a purge system to the manual valve and pressurizing the purge system with an inert gas, wherein said surge system is operable to receive gas from the cylinder when the manual valve is open, and includes a plurality of pneumatic valves for controlling gas flow through the purge system.

6. The method according to claim 5, further comprising the steps of pressurizing and depressurizing the purge system with inert gas a plurality of times to remove oxygen from said purge system.

7. The method according to claim 5, wherein the step of pressurizing the purge system includes the step of supplying pneumatic fluid to one of the pneumatic valves of the purge system to open said one of the pneumatic valves.

8. The method According to claim 7, further comprising the step of remotely viewing a flag member connected to the pneumatic valve to verify whether the pneumatic valve is open or closed.

9. The method according to claim 1, further comprising the step of remotely viewing a flag member connected to the pneumatic stepper mechanism to verify the incremental step of the manual valve.

10. The method according to claim 1, wherein said step of supplying pneumatic fluid to the pneumatic stepper mechanism includes supplying pneumatic fluid to a pneumatic cylinder, pivoting a drive arm with the pneumatic cylinder, rotating a gear in one direction with a driving pawl pivotably secured to said drive arm, and rotating the manual valve with drive pins connected to the gear for rotation therewith.

11. The method according to claim 10, further comprising the step of preventing the gear from rotating in an opposite direction with a locking pawl engaging the gear.

12. A remote opening system for a manual valve of a gas cylinder, said remote opening system comprising:

a pneumatic stepper mechanism adapted to rotationally interlock with the manual valve to open the manual valve, said pneumatic stepper mechanism being intermittently driven to incrementally open the valve, thereby releasing gas from the gas cylinder in a relatively slow and controlled manner;

a purge system connectable to the manual valve for receiving cylinder gas from the cylinder when the manual valve is opened, said purge system having a plurality of pneumatic valves for controlling gas flow through the purge system;

a source of purge gas for purging cylinder gas from the purge system, said source of purge gas being connected to one of said pneumatic valves of said purge system;

a control panel connected to said pneumatic stepper mechanism and said pneumatic valves of said purge system to selectively provide pneumatic fluid thereto; and a source of pneumatic fluid connected to said control panel.

13. The remote opening system according to claim 12, further comprising a flag member connected to said pneumatic stepper mechanism and rotatable about an axis to remotely indicate rotation of the manual valve.

14. The remote opening system according to claim 12, further comprising flag members connected to said pneumatic valves and movable between up and down positions to remotely indicate whether said pneumatic valves are open or closed.

15. A pneumatic stepper mechanism for opening a manual valve of a gas cylinder, said pneumatic stepper mechanism comprising:

a ratchet assembly including a gear rotatable about an axis, a drive bar pivotable about said axis, a pneumatic cylinder attached to said drive bar for pivoting said drive bar about said axis as said pneumatic cylinder extends and retracts, and a driving pawl pivotably attached to said drive bar and operably engaging said gear to rotate said gear in one direction as said drive bar pivots;

an attachment assembly including a plurality of drive pins connected to said gear and adapted to engage and rotate the manual valve as said gear rotates; and a valve for connecting the pneumatic cylinder to a source of pneumatic fluid said valve being operable to pause a supply of pneumatic fluid to the pneumatic cylinder, thereby preventing further rotation of the gear and, thus, the manual valve;

whereby the pneumatic stepper mechanism may be used to open the manual valve to release gas from the gas cylinder in a relatively slow and controlled manner.

16. The pneumatic stepper mechanism according to claim 15, further comprising a locking pawl operably engaging said gear to prevent rotation of said gear in an opposite direction as said pneumatic cylinder retracts.

17. The pneumatic stepper mechanism according to claim 15, further comprising a flag member connected to said gear and rotatable about said axis to indicate rotation of said gear at a remote location.

* * * * *

UNITED STATES PATENT AND TRADEMARK OFFICE
CERTIFICATE OF CORRECTION

PATENT NO. : 6,085,770
DATED : July 11, 2000
INVENTOR(S) : MacNeal et al.

It is certified that error appears in the above-identified patent and that said Letters Patent is hereby corrected as shown below:

Column 9, line 8, delete "surge", and insert
--purge--.

Column 9, line 20, delete "According", and insert
--according--.

Signed and Sealed this

Third Day of April, 2001

Attest:

NICHOLAS P. GODICI

*Attesting Officer*   *Acting Director of the United States Patent and Trademark Office*